(12) United States Patent
Guggenberger et al.

(10) Patent No.: US 11,013,074 B2
(45) Date of Patent: May 18, 2021

(54) DEHUMIDIFYING A COOKING CHAMBER

(71) Applicant: BSH Hausgeräte GmbH, Munich (DE)

(72) Inventors: Peter Guggenberger, Bad Endorf (DE); Markus Kuchler, Gstadt am Chiemsee (DE); Max Stief, Vogtareuth (DE)

(73) Assignee: BSH Hausgeräte GmbH, Munich (DE)

( * ) Notice: Subject to any disclaimer, the term of this patent is extended or adjusted under 35 U.S.C. 154(b) by 254 days.

(21) Appl. No.: 16/092,776

(22) PCT Filed: Aug. 1, 2017

(86) PCT No.: PCT/EP2017/069458
§ 371 (c)(1),
(2) Date: Oct. 11, 2018

(87) PCT Pub. No.: WO2018/033385
PCT Pub. Date: Feb. 22, 2018

(65) Prior Publication Data
US 2019/0166660 A1    May 30, 2019

(30) Foreign Application Priority Data
Aug. 19, 2016 (DE) .................... 10 2016 215 647.0

(51) Int. Cl.
*H05B 6/68* (2006.01)
*H05B 6/72* (2006.01)
(Continued)

(52) U.S. Cl.
CPC .......... *H05B 6/6458* (2013.01); *A47J 27/004* (2013.01); *A47J 36/32* (2013.01);
(Continued)

(58) Field of Classification Search
CPC ....... A47J 27/004; A47J 36/32; H05B 6/6482; H05B 6/645; H05B 6/6458; F24C 15/2007
(Continued)

(56) References Cited

U.S. PATENT DOCUMENTS

| 4,884,626 A | * | 12/1989 | Filipowski | .............. F24C 7/087 165/231 |
| 5,272,963 A | | 12/1993 | Del Fabbro | |
| 2015/0059595 A1 | | 3/2015 | Rand et al. | |

FOREIGN PATENT DOCUMENTS

| CH | 696039 A5 | 11/2006 |
| CN | 1746679 A | 3/2006 |

(Continued)

OTHER PUBLICATIONS

National Search Report CN 201780050558.2 dated Apr. 2, 2020.
(Continued)

*Primary Examiner* — Quang T Van
(74) *Attorney, Agent, or Firm* — Michael E. Tschupp; Andre Pallapies; Brandon G. Braun

(57) ABSTRACT

In a method to dehumidify a cooking chamber of a domestic cooking appliance, a condensation formation in the cooking chamber is ascertained. A dehumidification message connected to a dehumidification process is displayed when the condensation formation is detected, and a user action is awaited when the message is displayed. The dehumidification process is either performed or terminated depending on the user action. A domestic cooking appliance includes a cooking chamber and a display device and is configured to ascertain a condensation formation in the cooking chamber and to start a dehumidification process when the condensation formation is ascertained. The domestic cooking appliance is additionally configured to display a drying message connected to a dehumidification process on the display
(Continued)

device prior to starting the dehumidification process, to await a user action when the dehumidification message is displayed, and either to perform or terminate the dehumidification process depending on the user action.

14 Claims, 3 Drawing Sheets

(51) Int. Cl.
    *A21B 3/04*     (2006.01)
    *F24C 15/32*     (2006.01)
    *H05B 6/64*     (2006.01)
    *F24C 15/20*     (2006.01)
    *A47J 27/00*     (2006.01)
    *A47J 36/32*     (2006.01)

(52) U.S. Cl.
    CPC ......... *F24C 15/2007* (2013.01); *H05B 6/645* (2013.01); *H05B 6/6482* (2013.01)

(58) Field of Classification Search
    USPC ....... 219/685, 400, 401, 667, 680, 682, 684, 219/686, 702, 705, 707, 710; 99/468, 99/330, 331, 341, 467, 470, 476, 474, 99/473, 517, 629; 126/20, 21 A, 369, 126/369.1, 20.2, 369.3
    See application file for complete search history.

(56) References Cited

FOREIGN PATENT DOCUMENTS

| | | |
|---|---|---|
| CN | 104144270 A | 11/2014 |
| CN | 105351984 A | 2/2016 |
| DE | 3804678 A1 | 9/1989 |
| DE | 10213014 A1 | 10/2003 |
| DE | 10338138 A1 | 3/2005 |
| EP | EP-0567813 A2 * | 11/1993 ............. G01N 25/68 |
| JP | 2000274693 A | 10/2000 |

OTHER PUBLICATIONS

National Search Report DE 10 2016 215 647.0 dated Apr. 25, 2017.
International Search Report PCT/EP2017/069458 dated Nov. 10, 2017.

* cited by examiner

DEHUMIDIFYING A COOKING CHAMBER

CROSS-REFERENCES TO RELATED APPLICATIONS

This application is the U.S. National Stage of International Application No. PCT/EP2017/069458, filed Aug. 1, 2017, which designated the United States and has been published as International Publication No. WO 2018/033385 A1 and which claims the priority of German Patent Application, Ser. No. 10 2016 215 647.0, filed Aug. 19, 2016, pursuant to 35 U.S.C. 119(a)-(d).

BACKGROUND OF THE INVENTION

The invention relates to a method for dehumidifying a cooking chamber of a household cooking appliance, wherein condensate formation is determined in a cooking chamber of the household cooking appliance. The invention also relates to a household cooking appliance, having a cooking chamber, a microwave facility for applying microwaves to the cooking chamber, at least one resistance heater for emitting heat radiation into the cooking chamber and a display facility for displaying information, the household cooking appliance being designed to determine condensate formation in the cooking chamber and to start a dehumidification process. The invention can in particular be applied advantageously to microwave cooking appliances, in particular microwave cooking appliances with additional heating In microwave cooking appliances in practice only the food being cooked is heated by microwave operation, not the appliance interior or attachments in the interior. Heated food frequently gives off water vapor, which condenses at cold points in the appliance interior (for example on a wall ("muffle") of the associated cooking chamber and in some instances on attachments). The condensate can generally not be removed by normal appliance ventilation, as the air flow does not act sufficiently effectively and for a sufficiently long time and surfaces on which the condensate has formed are not warm enough for adequate evaporation to take place. This can result in corrosion of the muffle or attachments if condensate remains in the appliance for a fairly long time.

The simplest way in principle of removing condensate is to wipe the cooking chamber out manually. This is time consuming and not always easy to do when there are integrated accessories or attachments (for example a heating unit or suspended shelves).

CH 696 039 A5 discloses a combined oven with microwave and drying function. To this end an oven is fitted with a resistance heater and microwave generator. In order to prevent condensate forming on the muffle walls as food is heated, the resistance heater is activated during part of the heating operation. The resistance heater is deactivated again when the temperature in the cooking chamber reaches a predefined threshold value of 70° C. for example. This prevents unpleasant odors and the like. An oven is fitted with a cooking chamber, a resistance heater arranged on the cooking chamber for heating the cooking chamber, a microwave generator for heating food in the cooking chamber and a controller for controlling the resistance heater and the microwave generator, the controller having at least one microwave program that can be activated by the user and activates the microwave generator, the controller being configured in such a manner that the microwave program for drying the cooking chamber activates the resistance heater for heating the cooking chamber to maximum 100° C. The oven can have a temperature sensor in or on the cooking chamber and the controller can be configured in such a manner that the microwave program only activates the resistance heater until the temperature sensor reaches a setpoint temperature. In one variant the controller is configured in such a manner that the microwave program activates the microwave generator in a first step and also activates the resistance heater after a predefined time. In a further variant the predefined time is at least 30 seconds, in particular approx. two minutes. In a further variant it has selection means for selecting an operating output of the microwave generator and the controller is configured in such a manner that the microwave program only activates the resistance heater when an operating output above a threshold output is selected, the threshold output being greater than zero, in particular greater than 300 watts, preferably approx. 450 watts. In a further variant it has a fan for circulating air in the cooking chamber, the controller being configured in such a manner that the microwave program starts the fan at least during a part of a program runtime of the microwave program. In a further variant the controller is configured in such a manner that the microwave program deactivates the fan before it deactivates the microwave generator. In a further variant the controller is configured in such a manner that the microwave program deactivates the fan when a cooking chamber temperature exceeds a predefined value, in particular approx. 70° C. In a further variant the controller is configured in such a manner that the microwave program for drying the cooking chamber activates the resistance heater for heating the cooking chamber to a setpoint temperature between 60° C. and 80° C., in particular approx. 70° C. In a further variant the controller is configured in such a manner that the microwave program deactivates the resistance heater until the end of the program after the setpoint temperature has been reached.

DE 38 04 678 A1 discloses a method for operating an oven with microwaves and electrical resistance heating. In a cooking appliance with microwave heating and electrical resistance heating a vapor extraction duct is provided with a vapor extraction blower. The speed of the vapor extraction blower is varied by way of sensors for the humidity and temperature of the vapor which are arranged in the vapor extraction duct.

BRIEF SUMMARY OF THE INVENTION

It is the object of the present invention to overcome at least some of the disadvantages of the prior art and in particular to allow condensation in a cooking chamber to be managed in a particularly convenient manner after a cooking process.

This object is achieved according to the features of the independent claims. Preferred embodiments will emerge in particular from the dependent claims.

The object is achieved by a method for dehumidifying a cooking chamber of a household cooking appliance, wherein condensate formation is determined in a cooking chamber of the household cooking appliance; when condensate formation has been detected, a dehumidification message associated with a dehumidification process is displayed in a display facility; when the dehumidification message is displayed, a user action is awaited and the dehumidification process is either performed or terminated as a function of the user action.

This method has the advantage that the dehumidification process (which can also referred to as the drying process) or a dehumidification function is only active when required. This reduces deployment frequency and power consumption and improves user awareness. The user is actively informed by the household cooking appliance about this operating mode (dehumidification operating mode) and experiences the convenience of automatically offered dehumidification or drying more distinctly and consciously than with dehumidification initiated purely by the user. With this method—unlike with dehumidification controlled fully automatically by the appliance—the user can also influence the performance of the dehumidification process, for example whether or not it should be performed at all. The household cooking appliance offers the user dehumidification at an appropriate time point so the user him/herself does not have to think about initiating dehumidification and also does not have to take the time to look for a corresponding program point when being guided through operation of the household cooking appliance.

Dehumidification can generally also be referred to as drying. Condensate formation can also be referred to as condensation, misting or precipitation.

The household cooking appliance can be an oven, a microwave appliance, a steam treatment appliance or any combination thereof. The household cooking appliance can be a low-temperature appliance, wherein a maximum cooking chamber temperature that can be reached in the cooking chamber does not exceed 150° C. for example. The household cooking appliance can in particular be a microwave appliance, which also has at least one electrical resistance heater for heating the cooking chamber. Such a microwave appliance is in particular a low-temperature appliance. However the household cooking appliance can also be an oven with microwave functionality.

Condensate formation can in particular refer to a configuration of condensed water (e.g. in drop form) on a surface of a wall of the cooking chamber (e.g. on a side wall or the top) and/or on an attachment. Determining condensate formation can comprise or be measuring or estimating the condensate formation. Determining condensate formation can comprise a quantitative determination of a quantity of condensate (e.g. a degree of cover of the condensate on a predefined surface) or a qualitative determination of condensate formation (e.g. formation/non-formation of a practically perceptible quantity of condensate). In particular when determining condensate formation quantitatively the detection of condensate formation can comprise detection of a predefined minimum measurement or quantity of condensate.

In one development the determining of the predefined minimum measurement comprises the detection of whether a determined quantity of condensate has reached or exceeded a predefined threshold value.

The display facility can be an alphanumeric display facility, which displays for example clear text or the like to a user. The display facility can have a segment display or a screen, e.g. an LCD screen. The screen can be a touchscreen. The display facility can be integrated in an operating panel.

That the dehumidification message is displayed in the display facility when condensate formation is detected can mean that the dehumidification message is displayed in the display facility after condensate formation is detected. Detection of condensate formation comprises in particular positive detection (presence of condensate formation).

That a user action is awaited when the dehumidification message is displayed can mean that displaying and waiting take place at least to some extent at the same time.

In one embodiment the user action comprises actuation of an operating element of the household cooking appliance. For example the user can actuate a button or touch a touch-sensitive field of a touchscreen. This has the advantage that an unintended user action is practically excluded.

In a further embodiment the user action comprises opening and/or closing a cooking chamber door of the household cooking appliance, in particular opening and closing the cooking chamber door. This has the advantage that an exchange of air between the cooking chamber and its surroundings can also take place together with the user action, helping with dehumidification. Also the user does not have to take the time to actuate an operating element. It is assumed here that the user has removed the food being cooked after opening the cooking chamber door. This can be seen as a condition for starting the drying function (food should advantageously no longer be present in the appliance during the drying function, causing it to dry out). No further interaction with the operating element is required on the part of the user after closing.

In a further embodiment condensate formation is determined optically. To this end an optical sensor facility can be used, seeking the presence of condensate or condensation optically on a predefined measurement surface (for example a predefined region of the cooking chamber wall) exposed to the cooking chamber. The optical sensor facility can be used for example to measure the brightness or brightness distribution of the measurement surface. The optical sensor facility can have an optical sensor, for example a brightness sensor or an image sensor such as a CMOS sensor or CCD sensor. The optical sensor facility can have a light source to illuminate the measurement surface, for example an LED. The optical sensor facility can have an evaluation facility, which is coupled to the optical sensor, for example an image evaluation facility. This can also be referred to as a "direct" measurement. With this embodiment condensate formation can be determined quantitatively (e.g. by way of a degree of cover) or qualitatively (e.g. as the presence or non-presence of condensate formation).

In a further embodiment condensate formation is determined by the precipitation of moisture on a sensor field of a humidity sensor. This allows a particularly reliable quantitative and/or qualitative determination of condensate formation, in particular irrespective of the contents or fittings of the cooking chamber. Such a structure can also be particularly compact.

In one development condensate formation is determined—qualitatively or quantitatively—by means of an air humidity measurement in the cooking chamber. Alternatively or additionally condensate formation can be determined by an attenuation of microwave beams or ultrasound waves. Alternatively or additionally condensate formation can be determined by measuring a resonant frequency of the muffle during microwave or ultrasound excitation. Such measurements can also be referred to as "indirect" measurements.

In a further embodiment condensate formation is determined, in particular estimated, based on a cooking chamber temperature. This has the advantage that a temperature sensor that is already present can be used for the purpose. It also increases prediction accuracy in respect of the presence of condensate formation.

In an alternative or additional embodiment condensate formation is determined, in particular estimated, based on an operating duration of a preceding cooking process. This also increases prediction accuracy.

In another alternative or additional embodiment condensate formation is determined, in particular estimated, based on an operating mode of a preceding cooking process. This can also increase prediction accuracy.

In one embodiment in particular condensate formation is determined based on whether the operating mode is a microwave operating mode, as in microwave operating mode food being cooked is only irradiated for a relatively short time and the muffle is not heated by microwave radiation. This can result in a significant vapor input from the food into the cooking chamber, said vapor condensing in significant quantities on the cold muffle. The duration of microwave operation is frequently too short to allow the muffle to be heated sufficiently by heat transfer to prevent condensate formation.

For example it is possible to estimate (generally or only in the event of an unclear sensor signal) from the preceding operating mode and the measured cooking chamber temperature whether a substantial quantity of condensate is likely to have formed in practice and whether it is necessary or expedient to deploy the drying function. In one development therefore for cooking temperatures above 100° C. subsequent deployment of the dehumidification function is generally not necessary, as moisture precipitation is reduced at such surface temperatures. The same applies to longer cooking operations at high temperatures, in which although a great deal of moisture can be produced, it can be removed completely by the appliance ventilation system during a correspondingly long cooking down phase after the end of operation. One option for determining the presence of condensate formation or expedient activation of the dehumidification function is therefore to measure the cooking chamber temperature, taking into account the preceding operating mode. In particular for example a preceding, typically short, microwave operation at otherwise low (<100° C.) cooking chamber temperatures is one instance in which the drying function is very likely to be expedient.

In another embodiment the cooking chamber is heated and/or ventilated during the dehumidification process. Ventilation, for example by means of a vapor extraction apparatus, allows the cooking chamber to be filled with drier ambient air, also allowing condensed water to pass back into the air. Heating allows the condensed water to be evaporated directly and/or to be evaporated by heating the muffle. Both help to dehumidify or dry the muffle.

In another embodiment the cooking chamber is heated by the emission of heat radiation from an electrically operated heating facility during the dehumidification process. This can be achieved with an economical, robust and compact structure. The electrically operated heating facility can have one or more electrical resistance heating elements. The electrical resistance heating elements can be permanently incorporated (e.g. as a bottom heating unit, a top heating unit and/or as a ring or circulating air heating unit) or can be an insert. In one development the heating facility can also be used to cook food. This can be done with and/or independently of the use of a microwave facility. The output of the heating facility can be such that it is only designed for low-temperature operation. Alternatively the output of the heating facility can be such that it can also heat the cooking chamber to higher cooking chamber temperatures (e.g. of 100° C. or more, in particular 150° C. or more).

In one development a temperature of large and easily touchable surfaces of the muffle (e.g. the bottom and side walls) and/or a door inner face cannot become so hot during the dehumidification process that there is a burning risk for the user.

Microwave and low-temperature cooking appliances can be designed such that the cooking chamber temperature also does not rise above a temperature limit for plastic dishes during the dehumidification process. This ensures that plastic dishes left in the cooking chamber during the dehumidification process are not destroyed or set on fire.

Low cooking temperatures after the dehumidification process can also be advantageous in that it is then not necessary to wait too long until the cooking chamber temperature drops below a maximum value required for specific functions. Such a maximum value can be for example 40° C. for low-temperature cooking or "gentle cooking".

In one development a circulating air blower is activated during the dehumidification process, in order advantageously to be able to heat all the regions of the cooking chamber and muffle reliably by air circulation.

In one development a microwave facility (microwave heater) is activated or operates during the dehumidification process to further assist heating.

In another embodiment the dehumidification process is automatically performed if no user action is received within a predefined time period. This allows dehumidification to be performed even if the user does not respond to the dehumidification message, for example because said user is not present. This embodiment can be dependent on a first condition, for example whether the household cooking appliance has already been deactivated after a cooking process (but still has power) or has been switched to standby mode.

In an alternative or additional embodiment the dehumidification process is automatically terminated, in particular is not even started, if no user action is received within a predefined time period. This embodiment has the advantage that automatic performance of the dehumidification process with its associated energy consumption and associated noise can be reliably prevented. This embodiment can be dependent on a second condition, for example whether the household cooking appliance is still activated after a cooking process.

In one development the duration of the dehumidification process is selected such that the condensate dries up completely. Complete drying can be determined by sensor. If there is no sensor system, an empirically determined operating duration can be determined for the respective household cooking appliance.

The object is also achieved by a household cooking appliance designed to perform the method. The household cooking appliance can be developed in the same way as the method and has the same advantages.

In one embodiment the household cooking appliance has a cooking chamber, a microwave facility for applying microwaves to the cooking chamber, at least one resistance heater for emitting heat radiation into the cooking chamber and a display facility for displaying information, the household cooking appliance being designed to determine condensate formation in the cooking chamber and to start a dehumidification process when condensate formation is (positively) determined, and the household cooking appliance also being designed to display a message associated with a dehumidification process (dehumidification message) in a display facility before the dehumidification process starts, to await a user action when the dehumidification message is displayed and either to perform or terminate (in particular not even to start) the drying operation as a function of the user action.

The household cooking appliance can have a control facility, which is connected to the microwave facility and the at least one resistance heater and can operate these. In particular the control facility can then be designed to perform the method, for example by means of a corresponding hardware-based or software-based embodiment. The control facility can then be connected to at least one sensor. The control facility can be configured as an evaluation facility for evaluating measurement values from the sensor and/or for detecting condensate formation.

BRIEF DESCRIPTION OF THE DRAWINGS

The properties, features and advantages of the present invention described above and the manner in which these are achieved will become clearer and more readily comprehensible in conjunction with the following schematic description of an exemplary embodiment, which is explained in more detail below in conjunction with the drawings.

DETAILED DESCRIPTION OF EXEMPLARY EMBODIMENTS OF THE PRESENT INVENTION

Figure 1:
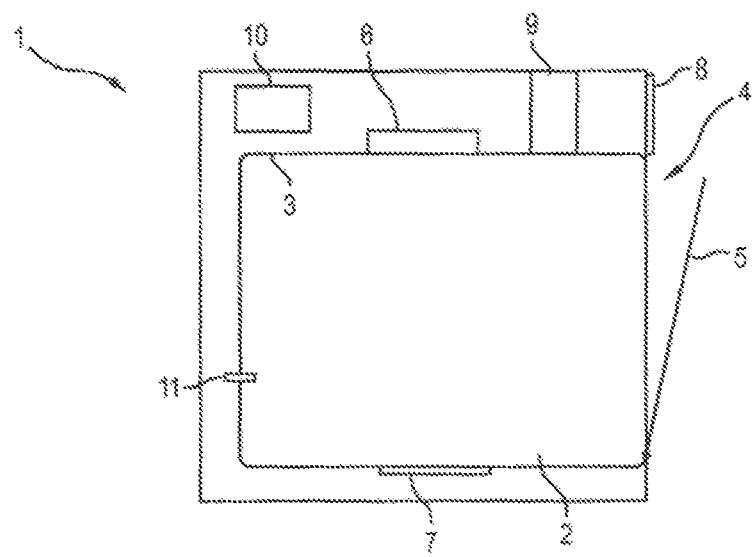
FIG. 1 shows a household cooking appliance designed to perform the method.

FIG. 1 shows a household cooking appliance 1 designed to perform the method in the form of a combined oven/microwave appliance. The household cooking appliance 1 has a cooking chamber 2, which is delimited by a muffle 3. The cooking chamber 2 and muffle 3 have a front loading opening 4, which can be closed by a door 5. The door 5 here is shown as horizontally pivotable but it can also be vertically pivotable. The household cooking appliance 1 also has a microwave facility 6 for applying microwaves to the cooking chamber 2 and at least one resistance heater 7 for emitting heat radiation into the cooking chamber 2. The resistance heater 7 can have a bottom heating unit, a top heating unit and/or a ring heating unit. The household cooking appliance 1 can have a circulating air blower (not shown) located for example in proximity to the ring heating unit, to allow air to circulate in the cooking chamber, for example to provide a hot air function. The household cooking appliance 1 also has a display facility 8 for displaying information, for example a touchscreen in the region of a front panel. The household cooking appliance 1 also has a vapor extraction facility 9 for ventilating the cooking chamber 2. The household cooking appliance 1 also has a control facility 10 for controlling the microwave facility 6, the resistance heater 7 and the vapor extraction facility 9. The control facility][19]] 10 can receive user inputs by way of the display facility 8. The control facility 10 is also connected to at least one sensor 11, for example a temperature sensor for measuring a cooking chamber temperature.

The household cooking appliance 1, in particular its control facility 10, is designed to determine condensate formation in the cooking chamber 2 and, when condensate formation is positively determined or ascertained, to start a dehumidification process.

Figure 2:
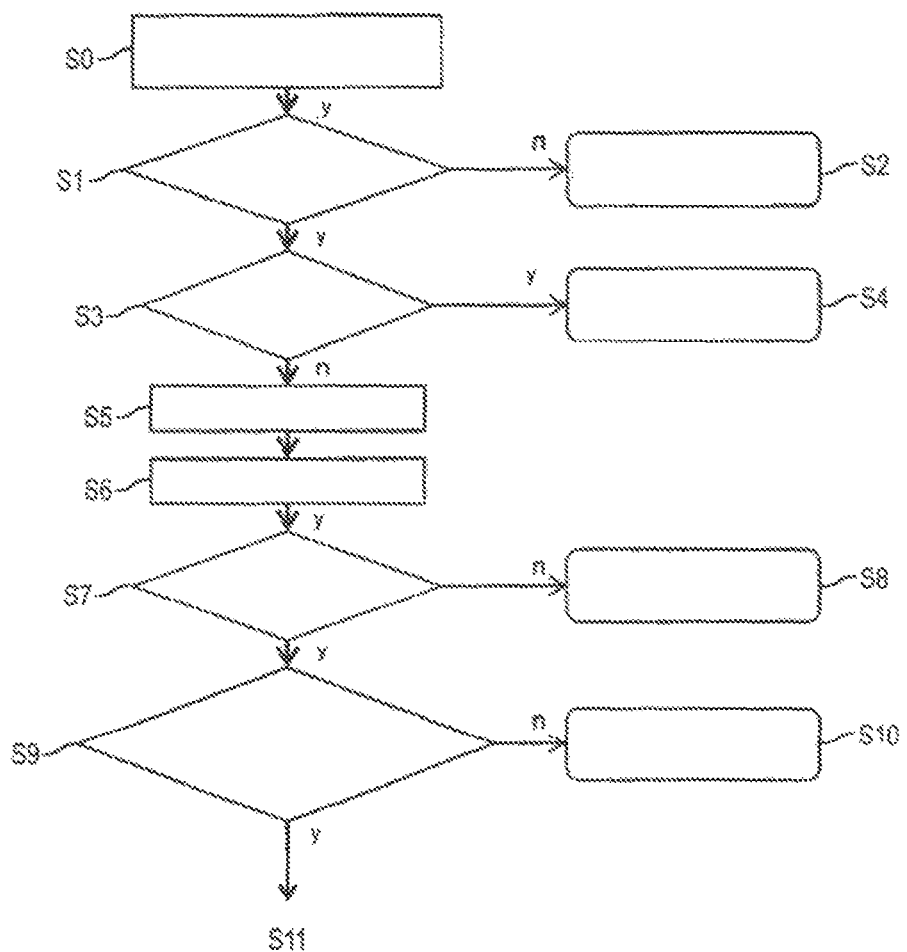
FIG. 2 shows a first segment of a flow diagram for performing the method.

FIG. 2 shows a first segment of a flow diagram for performing a possible method for dehumidifying or drying the cooking chamber 2 of the household cooking appliance 1.

In a step S0 a user has performed a microwave cooking operation for cooking food (not shown) present in the cooking chamber 2, by activating the microwave facility 6. The resistance heater 7 was deactivated during this process by way of example.

In a first step S1 of the method following termination of the microwave cooking operation the control facility 10 checks whether an operating duration of the microwave cooking operation from S0 has reached or exceeded a predefined value, in this instance for example one minute.

If not ("n"), a dehumidification process is not performed; instead in a step S2 the household cooking appliance 1 is switched to a mode in which no dehumidification process is performed. For example in step S2 the household cooking appliance 1 can display any selection menu when the timer has run down or can be switched to a standby mode by pressing an on/off button, etc.

If yes ("y"), in a step S3 it is checked whether a cooking chamber temperature detected by the at least one sensor 11 has reached or exceeded a predefined value, for example 80° C.

If yes ("y"), a dehumidification process is not performed; instead in a step S4 the household cooking appliance 1 is switched to a mode in which no dehumidification process is performed. For example the household cooking appliance 1 can be switched to a standby mode by pressing an on/off button, etc.

If not ("n"), in a step S5 fan operation is started.

In a step S6 it is detected that a user is opening the door 5, for example to remove the cooked food from the cooking chamber 2.

In a subsequent step S7 it is checked whether the door 5 has been closed again within a predefined time period, for example two minutes.

If not ("n"), a dehumidification process is not performed; instead in a step S8 the household cooking appliance 1 is for example switched to a standby mode. Use is made of the fact here that the cooking chamber 2 can be dried out without a dedicated dehumidification process when the door 5 is open.

If yes ("y"), in a step S9 it is checked whether a door opening and door closing operation 5 was performed within a further predefined time period, for example six minutes, after termination of step S0. This verifies whether the user has removed the food, before the dehumidification process starts. Removal can only have taken place if the door has been opened and closed. The time period of six minutes was selected in view of the fact that the user might feel perturbed if the household cooking appliance 1 were to try to perform a dehumidification process after longer than six minutes.

If not ("n"), a dehumidification process is not performed; instead in a step S10 the household cooking appliance 1 is switched to a standby mode for example.

Figure 3:
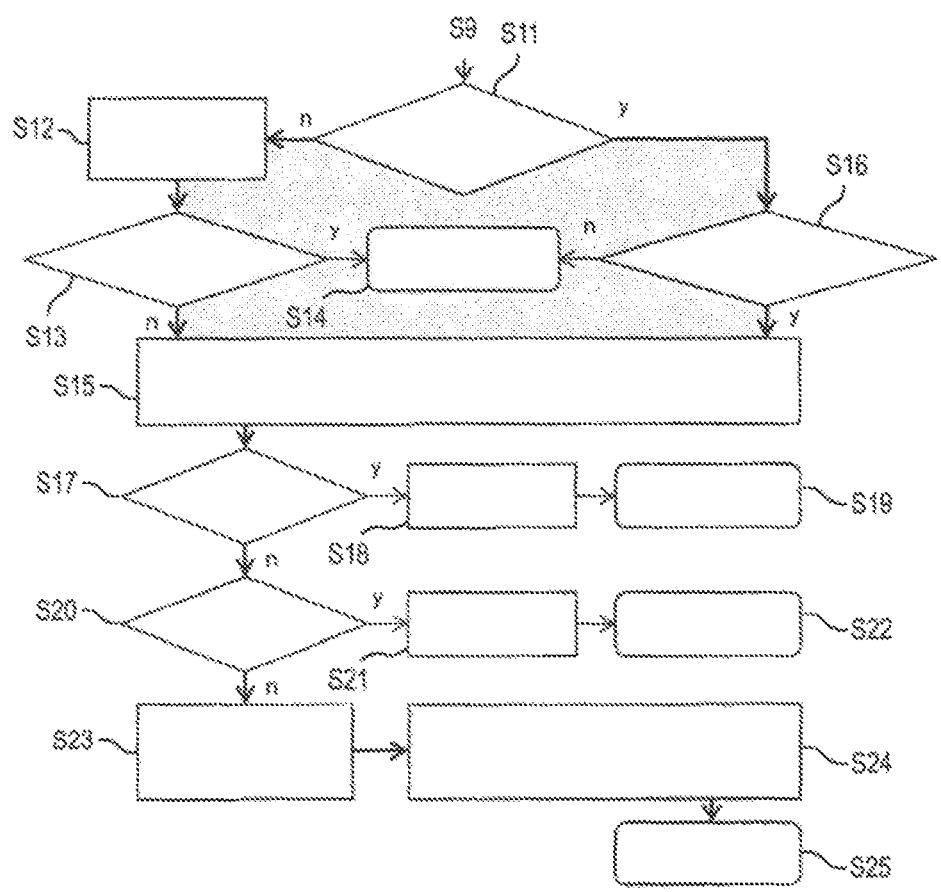
FIG. 3 shows a second segment of a flow diagram for performing the method.

If yes ("y"), the method continues with a step S11 as shown in FIG. 3.

FIG. 3 shows a second segment of the flow diagram for performing the method.

In step S11 it is checked whether the household cooking appliance 1 has already been switched to a standby mode by the user, for example by pressing an on/off button. In standby mode the household cooking appliance 1 remains connected to a power supply and the control facility 10 can continue to operate the microwave facility 6, the resistance heater 7 and/or the vapor extraction facility 9. The display facility 8 and a cooking chamber light (not shown) for example can be deactivated when the switch is made to standby mode, the control facility 10 being able to activate these two appliance components again when required. It is taken into account here that when the on/off switch is actuated (for example to terminate a microwave operation or in some instances thereafter), the household cooking appliance 1 advantageously does not automatically start a heating operation. A user request is therefore provided at this point.

If not ("n"), in a step S12 a dehumidification message is displayed in the display facility 8, asking a user to open the door 5, for example by displaying the text "Open door to dry". The display can be shown for a predefined time period, for example six seconds. It is assumed here that, if the user is in front of the household cooking appliance 1 and paying attention to the display, a time period of several seconds is sufficient. Equally this is a compromise so as not to confuse the customer with one display after another, if said customer is not interested in drying once the food is "ready".

In a subsequent step S13 it is checked whether the door 5 has been opened within a further time period, e.g. 30 seconds from the display or from cancelation of the dehumidification message from step S12.

If this is so ("y"), in a step S14 the household cooking appliance 1 is switched for example to a standby mode. Use is also made here of the fact that that the cooking chamber 2 can also dry out without a dedicated dehumidification process when the door 5 is open.

If not ("n"), in a step S15 the dehumidification process or dehumidification function per se is started. The dehumidification process can take place with the microwave facility 6, the resistance heater 7, the circulating air blower and/or the vapor extraction facility 9 activated or switched on.

If in step S11 the user has already switched the household cooking appliance 1 to a standby mode ("y"), in a subsequent step S16 a further dehumidification message is displayed in the display facility 8, asking a user to indicate whether the dehumidification process should be started, for example by displaying the text "Start drying? Yes/No". A user can input his/her choice by way of the display facility 8. If the household cooking appliance 1 detects that the user has input agreement ("y"), in step S15 the dehumidification process is started. If the household cooking appliance 1 detects that the user has input rejection ("n"), in a step S14 the household cooking appliance 1 is switched for example to a standby mode. If no user input takes place, the household cooking appliance 1 or the control facility 10 can (a) continue with step S14, (b) continue with step S15 or (c) remain in request mode, depending on the embodiment.

During step S15 the household cooking appliance 1 or the control facility 19 checks in a (sub)step S17 whether a user is actuating the on/off button (e.g. a separate button or a corresponding touch field of the display facility 8).

If so ("y"), in a step S18 interruption of the dehumidification process is displayed (for example by displaying the text "Drying interrupted") in the display facility 8 and in a step S19 the household cooking appliance 1 interrupts step S15 and switches to a standby mode or state.

If not ("n"), the household cooking appliance 1 or the control facility 10 checks in a (sub)step S20 whether a user has actuated any other operating element (e.g. a separate button, a rotary actuator or a corresponding field of the display facility 8).

If so ("y"), in a step S21 interruption of the dehumidification process is displayed (for example by displaying the text "Drying interrupted") in the display facility 8 and in a step S22 a menu, e.g. a main menu, is displayed in the display facility 8 while step S15 is interrupted.

If not ("n"), the household cooking appliance 1 or the control facility 10 terminates the dehumidification process after a predefined time period (e.g. six minutes) in a step S23.

An instruction text is then displayed in the display facility 8 in a step S24, for example asking that the door 5 be opened for two minutes. This can be associated with the outputting of an instruction tone. The instruction text may only be displayed for a predefined time period, for example two minutes. An oven light (not shown) can always be deactivated when the door 5 is open.

In a step S25 the household cooking appliance 1 is then switched to standby mode.

During the method sequence described above condensate formation is determined, or more specifically estimated or assumed, by means of the steps S1, S3, S7 and optionally S9.

The present invention is of course not restricted to the illustrated exemplary embodiment.

As an addition or alternative to steps S1, S3, S7 and/or S9 condensate formation can be measured directly or indirectly quantitatively and/or qualitatively by means of a sensor, e.g. the sensor 11. Such a sensor can be an optical sensor.

Generally "one" can refer to one or a number, in particular in the sense of "at least one" or "one or more", unless this is specifically excluded, for example by the expression "just one" etc.

A number can comprise precisely the specified number as well as a standard tolerance range, unless this is specifically excluded.

LIST OF REFERENCE CHARACTERS

1 Household cooking appliance
2 Cooking chamber
3 Muffle
4 Loading opening
5 Door
6 Microwave facility
7 Resistance heater
8 Display facility
9 Vapor extraction facility
10 Control facility
11 Sensor
S0-S25 Process steps

The invention claimed is:

1. A method for dehumidifying a cooking chamber of a household cooking appliance, said method comprising:
   determining a condensate formation in a cooking chamber of the household cooking appliance;
   displaying a dehumidification message associated with a dehumidification process, when the condensate formation is determined;
   awaiting a user action, when the dehumidification message is displayed; and
   performing or terminating the dehumidification process as a function of the user action.

2. The method of claim 1, wherein the user action comprises actuation of an operating element of the household cooking appliance.

3. The method of claim 1, wherein the user action comprises opening a cooking chamber door of the household cooking appliance.

4. The method of claim 1, wherein the condensate formation is determined optically.

5. The method of claim 1, wherein the condensate formation is determined by a precipitation of moisture on a sensor field of a humidity sensor.

6. The method of claim 1, wherein the condensate formation is determined based on a cooking chamber temperature.

7. The method of claim 1, wherein the condensate formation is determined based on an operating duration of a preceding cooking process.

8. The method of claim 1, wherein the condensate formation is determined based on an operating mode of a preceding cooking process.

9. The method as claimed in claim 8, wherein the condensate formation is determined based on whether the operating mode is a microwave operating mode.

10. The method of claim 1, further comprising heating and/or ventilating the cooking chamber during the dehumidification process.

11. The method of claim 10, further comprising heating the cooking chamber by emission of heat radiation from an electrically operated heating facility during the dehumidification process.

12. The method of claim 1, further comprising automatically performing the dehumidification process in the absence of receiving a user action within a predefined time period.

13. The method of claim 1, further comprising automatically terminating the dehumidification process in the absence of receiving a user action within a predefined time period.

14. A household cooking appliance, comprising:
a cooking chamber;
a microwave facility configured to apply microwaves to the cooking chamber;
at least one resistance heater configured to emit heat radiation into the cooking chamber; and
a display facility configured to display information,
said household cooking appliance being configured
- to determine a condensate formation in the cooking chamber,
- to start a dehumidification process when the condensate formation is determined,
- to display a drying message associated with a dehumidification process in the display facility before the dehumidification process starts,
- to await a user action when the dehumidification message is displayed, and
- to perform or terminate the dehumidification process as a function of the user action.

* * * * *